United States Patent Office 3,519,361
Patented July 7, 1970

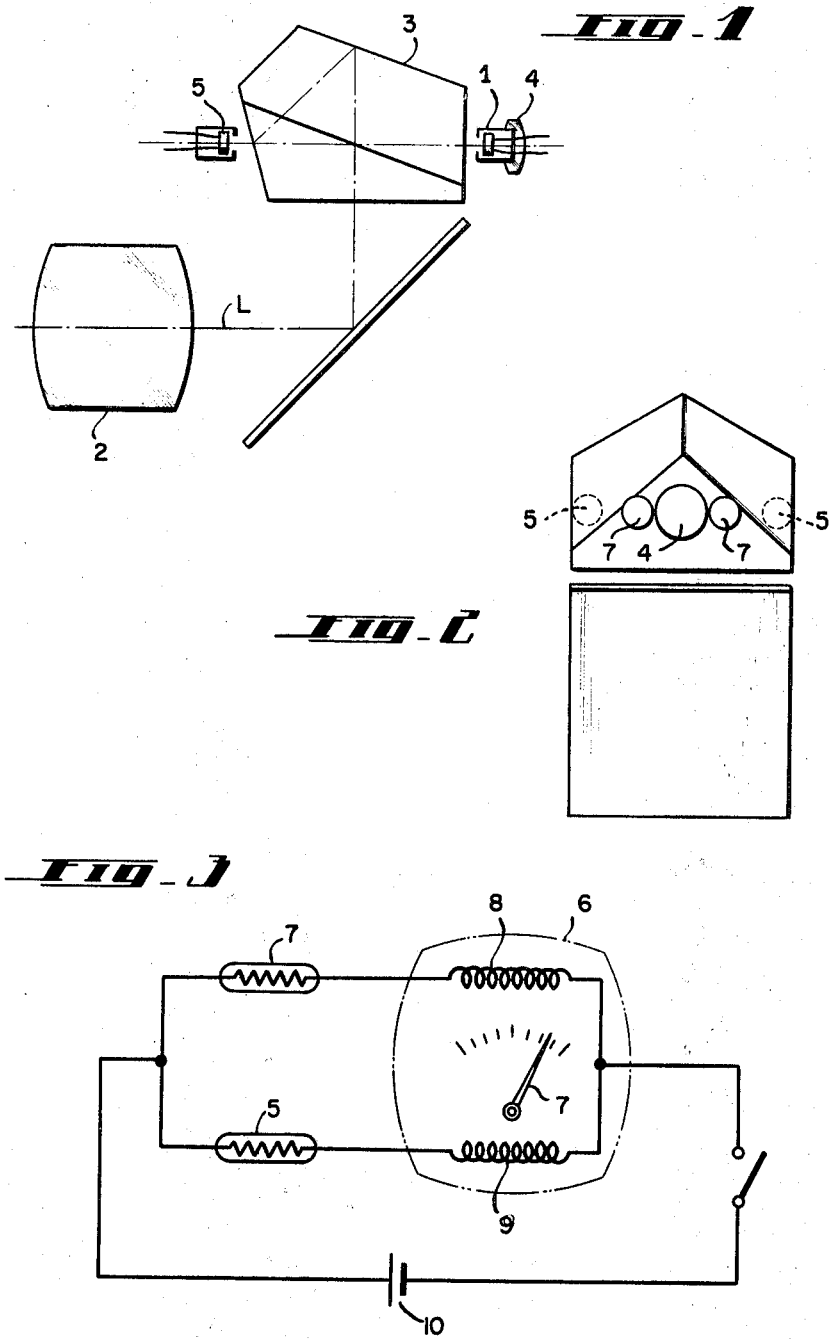

3,519,361
LIGHT MEASURING SYSTEM
Tsuneo Hidaka and Koichiro Watanabe, Tokyo-to, Japan, assignors to Asahi Kogaku Kogyo Kabushiki Kaisha, Tokyo-to, Japan, a corporation of Japan
Filed June 12, 1968, Ser. No. 736,510
Claims priority, application Japan, June 15, 1967, 42/37,826
Int. Cl. G01j 1/10, 1/42, 1/44
U.S. Cl. 356—219
9 Claims

ABSTRACT OF THE DISCLOSURE

A through-the-lens light measuring system includes an objective lens, a pentaprism having a front reflector face with a transparent area and a rear viewing face confronting an eyepiece. A first photoconductor faces the rear face offset from the eyepiece and a second photoconductor faces the front face transparent surface. The first photoconductor is connected through a first coil of a differential current meter to a battery and the second photoconductor is connected through the meter opposing coil to the battery. The meter and viewer optical system are so related that the meter reading is a function of $$\frac{S-bM}{a-b}$$

wherein M is the light incident on the first photoconductor, S is the light incident in the second photoconductor, $a$ is the ratio of the objective light incident on the second photoconductor to that on the first, and $b$ is the ratio of the eyepiece entering light incident on the second conductor to that on the first and $a \neq b$, whereby the meter reading is independent of the eyepiece entering light.

BACKGROUND OF THE INVENTION

The present invention relates generally to improvements in light measuring systems and it relates particularly to an improved through-the-lens light measuring system for single lens reflex cameras in which the light measurement is independent of light entering the viewing system through the eyepiece.

The through-the-lens light measuring systems heretofore employed and proposed possess numerous drawbacks and disadvantages. Important among these drawbacks is the inaccuracy of the light measurements which is a consequence of light entering the camera eyepiece and incident on the light sensitive element.

In a single lens reflex camera of the internal light receiving light measurement type (TTL type), the light sensitive or receiving element, which is positioned in the path of the light rays which have been directed from the object and have entered and passed through the camera objective (for example, in the viewer or range finder light path), receives, in addition to such object light rays which have passed through the camera objective, part of the external light rays entering the camera through the viewer or range finder eyepiece (hereinafter referred to as "the eyepiece light rays"). Incidence of such eyepiece light rays upon the light receiving element causes an error in the object light measurement.

Various systems have been proposed to eliminate such error. In view of the different paths of the object light rays and the eyepiece light rays, the former being through tive receiving element, in one system the light receiving the camera objective lens to the light sensitive receiving element and the latter from the eyepiece to the light sensipart is so selected, as to avoid the influence of the eyepiece light rays and arrangement is made to obstruct the eyepiece light rays path as far as possible. In another system an additional light receiving part for the purpose of measurement compensation is provided adjacent to the eyepiece so that the eyepiece light rays influence may be eliminated from the object light measurement result according to the light measurement result of said additional light receiving part.

In the aforesaid system, it is very difficult to completely eliminate the eyepiece light rays. In said latter system, the incident angle and the intensity of the eyepiece light rays vary considerably as the external light condition and the manner of photographing operation change, and the eyepiece light rays intensities as sensed at said compensation light receiving part and at the object light measurement light receiving part are not related to each other in a constant function because of the difference in optical path, so that effective light measurement is not to be expected with respect to eyepiece light rays of greatly varying incident angle and intensity.

SUMMARY OF THE INVENTION

It is thus a principal object of the present invention to provide an improved light measuring system.

Another of the present invention is to provide an improved through-the-lens light measuring system for single lens reflex cameras.

Still another object of the present invention is to provide an improved through-the-lens light measuring system which provides a light measurement substantially independent of light entering the viewer eyepiece.

A further object of the present invention is to provide an improved light measuring system of the above nature characterized by its accuracy, reliability, and versatility and being readily adaptable to pentaprism type single lens reflex cameras.

The above and other objects of the present invention will become apparent from a reading of the following description taken in conjunction with the accompanying drawing.

The light measuring system of the present invention eliminates the aforementioned disadvantage of the known types of internal light receiving light measurement systems of single lens reflex cameras so that the eyepiece light rays error in object light measurement is eliminated in a simple and efficient manner. For this purpose an object light measurement light receiving part or light sensitive element and a compensation light receiving part or light sensitive element are so positioned that the ratios of the object light rays brightness to the eyepiece light rays brightness of such two positions differ from each other; and elimination of the eyepiece light rays influence is carried out by so arranging the exposure meter circuit as to make the indication of the exposure meter correspond to $$\frac{S-bM}{a-b}$$

wherein M and S are brightnesses of the light rays incident respectively on the measurement light receiving part and the compensation light receiving part, and $a$ and $b$ are said different brightness ratios.

Thus in a sense, the present invention contemplates the provision of a light measuring device comprising a viewing system including an objective lens and an eyepiece, a first photosensitive element exposed to light entering through said objective lens and eyepiece, a second light sensitive element exposed to light entering through said objective lens and eyepiece, the ratio of said objective entering light incident on said second photoresponsive element to that incident on said first photoresponsive element, being different from the ratio of said eyepiece entering light incident on said second photoresponsive element to that incident on said first photoresponsive element, and means responsive to said photosensitive elements so relating said first and second photosensitive elements as to be substantially independent of the light entering said eyepiece. The network includes a meter which provides a reading corresponding to $$\frac{S-bM}{a-b}$$

wherein M is the brightness of the light incident on the first photosensitive element, S is the brightness of the light incident on the second photosensitive element, $a$ is the ratio of the objective light incident on the second photosensitive element to that on the first photosensitive element and $b$ is the ratio of the eyepiece light incident on the second photosensitive element to that on the first photosensitive element.

In accordance with a preferred form of the improved system, the system includes a pentaprism having a front face with a transparent surface and a transparent rear face confronting the eyepiece. The photosensitive elements are photoconductors, the first being exposed to the viewing face of the pentaprism transversely offset from the eyepiece and the second being exposed to the pentaprism front face transparent area, the photoconductors being connected through respective opposing coils of a differential current meter to a battery.

BRIEF DESCRIPTION OF THE DRAWINGS

FIG. 1 is a side elevational view of a system embodying the present invention illustrating the positions of the optical and light sensitive elements;

FIG. 2 is a rear view thereof; and

FIG. 3 is a circuit diagram of the electrical network forming part thereof.

DESCRIPTION OF THE PREFERRED EMBODIMENT

Referring now to the drawing which illustrates a preferred embodiment of the present invention, the improved light measuring system includes a pentaprism 3 of known construction having a bottom face for receiving the object light passing through an objective lens 2 and reflected by a mirror thereto, a rear transparent viewing face, a front reflector face having transparent side sections, and a top reflecting face. A medially located eyepiece lens 4 confronts the pentaprism rear face and a pair of light receiving or photosensitive elements 1, such as CdS photocells, are positioned along opposite sides of the eyepiece 4 and confront the pentaprism rear face and are in the path of object light rays L which have passed through the camera objective lens 2. A pair of compensating light receiving or photosensitive elements 5, such as CdS cells, are positioned at and confront the transparent side borders of the pentaprism front face in a position to receive light rays therethrough which have entered the eyepiece 4.

A differential type indicating current meter $b$ is provided with a pair of bucking coils 8 and 9 which act in mutually opposed relation to deflect a pointer 7. The photocell 1 is connected in series with the coil 8 and a switch across a battery 10 and the photocell 5 is connected in series with the coil 9 and said switch across said battery 10.

In operation, both the measurement light receiving part 1 and the compensation light receiving part 5 receive object light rays L which have passed through the camera objective lens 2 and the eyepiece light rays L'. Accordingly, the brightness M of the light received by the measurement light receiving part 1 consists of a brightness $m_o$ due to said object light rays L and another brightness $m_e$ due to the eyepiece light rays L'. Similarly, the brightness S of the light received by the compensation light receiving part 5 consists of a brightness $s_o$ due to the object light rays L and another brightness $s_e$ due to the eyepiece light rays L'. Thus, in mathematical form:

$$M = m_o + m_e \quad (I)$$
$$S = s_o + s_e \quad (II)$$

Now, the ratio $a$ of $s_o$ to $m_o$ is different from the ratio $b$ of $s_e$ to $m_e$:

$$\frac{s_o}{m_o} = a, \quad \frac{s_e}{m_e} = b$$

because of the difference of light paths L and L' to the light receiving parts 1 and 5 of different positions. Accordingly, the value S of the Equation II may be expressed as follows:

$$S = am_o + bm_e \quad (III)$$
$$(a \neq b)$$

by the measurement light receiving part 1. The following relation results from the Equations I and II:

$$bM - S = (b-a)m_o$$

$$m_o = \frac{S - bm}{a - b} \quad (a \neq b)$$

Thus, the brightness $m_o$ of the object light rays L can be obtained by adjusting the sensitivity characteristic of the exposure meter circuit in accordance with said brightness ratios $a$ and $b$ and on the basis of the brightnesses M and S sensed by the measurement and the compensation light receiving parts 1 and 5 respectively.

The circuit diagram illustrated in FIG. 3 is given merely by way of example of a network which may be employed in accordance with the present system. The brightnesses M and S can be detected through photocurrents controlled by the light receiving parts 1 and 5 respectively. The brightness ratios $a$ and $b$ are simply determined through design of the optical part of the camera in a manner well known to one skilled in the art. The differential indicating meter 6 is so designed, in the known manner, that the sensitivity of the coil 8 is $b$ times that of the coil 9 and that the sensitivity of the meter corresponds to $a-b$. Instead of such arrangement as shown in FIG. 2, the photocurrent circuit may be adjusted through a transistor amplification system, or a filter may be employed to control light rays incident on the light receiving part, or other suitable arrangement satisfying the above requirements may be employed.

Thus, the photocurrent under control of the light receiving parts 1 and 5 produces, when applied to said indicating meter 6, an indication corresponding to the brightness $m_o$ which is equal to $$\frac{S - bM}{a - b}$$

Thus, according to the present invention measurement and compensation light receiving parts are provided so as to receive both the object light rays which have passed throught the camera objective and the light rays entering the camera through the eyepiece, and at such positions that the ratios of the brightnesses of such light rays differ from each other. Thus, on the basis of the incident light rays brightenesses detected by the light receiving parts and through adjustment of the exposure meter indication sensitivity or of the photocurrent circuit, it is possible to eliminate the influence of the light rays entering through the eyepiece on the light measurement indication. As a result, accurate and reliable measurement of the object brightness can be easily accomplished.

While there has been described and illustrated preferred embodiments of the present invention, it is apparent that numerous alterations, omissions and additions may be made without departing from the spirit thereof.

What is claimed is:
1. A light measuring device comprising a viewing system including an objective lens and an eyepiece, first and second light responsive elements each exposed to light entering said objective lens and eyepiece, a current actuator device, and a network coupling said first and second light responsive elements and said current actuator device in accordance with the relationship

$$\frac{S-bM}{a-b}$$

wherein M and S are the brightnesses of the light incident on each of said respective first and second light responsive elements, and $a$ and $b$ are the ratios between the light brightnesses from said objective light incident on said light responsive elements and between the light brightnesses from said eyepiece light incident on said light responsive elements and wherein $a$ is unequal to $b$, the influence of the light entering the measuring device through said eyepiece on the measurement of light entering said objective lens is substantially eliminated.

2. The light measuring device of claim 1, wherein M and S are the light brightnesses on said first and second light responsive elements respectively, $a$ is the ratio of the objective light incident on said second light responsive element to that incident in said first light responsive element, and $b$ is the ratio of the eyepiece light incident on said second light responsive element to that incident on said first light responsive element.

3. The measuring device of claim 2 including a pentaprism positioned in the path of light between said objective lens and said eyepiece, said first and second light sensitive elements being exposed to transparent surfaces of said pentaprism.

4. The measuring device of claim 2 including a pentaprism positioned between said objective lens and said eyepiece and including a front reflecting face having a transparent surface and a rear viewing face confronting said eyepiece, said first light sensitive element being exposed to light from said pentaprism viewing face in an area transversely offset from said eyepiece and said second light sensitive element being exposed to light from said front face transparent surface.

5. The measuring device of claim 2 wherein said photosensitive elements comprise photoconductors said current actuator device comprises a differential current meter including a pair of opposing coils, and said network comprises a battery, and means for connecting one of said coils and photoconductors in series across said battery and the other of said coils and photoconductors in series across said battery.

6. The measuring device of claim 5 wherein the ratio of the sensitivities of said coils is substantially equal to $b$.

7. The measuring device of claim 5 wherein the sensitivity of said meter corresponds substantially to $a-b$.

8. The measuring device of claim 6 wherein the sensitivity of said meter corresponds substantially to $a-b$.

9. A light measuring device comprising a viewing system including an objective lens and an eyepiece, a first photosensitive element exposed to light entering through said objective lens and eyepiece, a second light sensitive element exposed to light entering through said objective lens and eyepiece, the ratio of said objective entering light incident on said second photoresponsive element to that incident on said first photoresponsive element, being different from the ratio of said eyepiece entering light incident on said second photoresponsive element to that incident on said first photoresponsive element, and means responsive to said photosensitive elements so relating said first and second photosensitive elements as to be substantially independent of the light entering said eyepiece.

References Cited

UNITED STATES PATENTS

| | | |
|---|---|---|
| 3,378,285 | 8/1968 | Sachs. |
| 3,401,614 | 9/1968 | Gunther. |
| 3,429,246 | 2/1969 | Ebertz. |
| 3,446,562 | 5/1969 | Caspersson et al. |
| 3,464,339 | 9/1969 | Trankner. |
| 3,465,660 | 9/1969 | Trankner et al. |

FOREIGN PATENTS

| | | |
|---|---|---|
| 398,295 | 2/1966 | Switzerland. |
| 415,101 | 12/1966 | Switzerland. |

RONALD L. WIBERT, Primary Examiner

W. A. SKLAR, Assistant Examiner

U.S. Cl. X.R.

95—10; 356—221, 222, 226, 229